Figure 1:
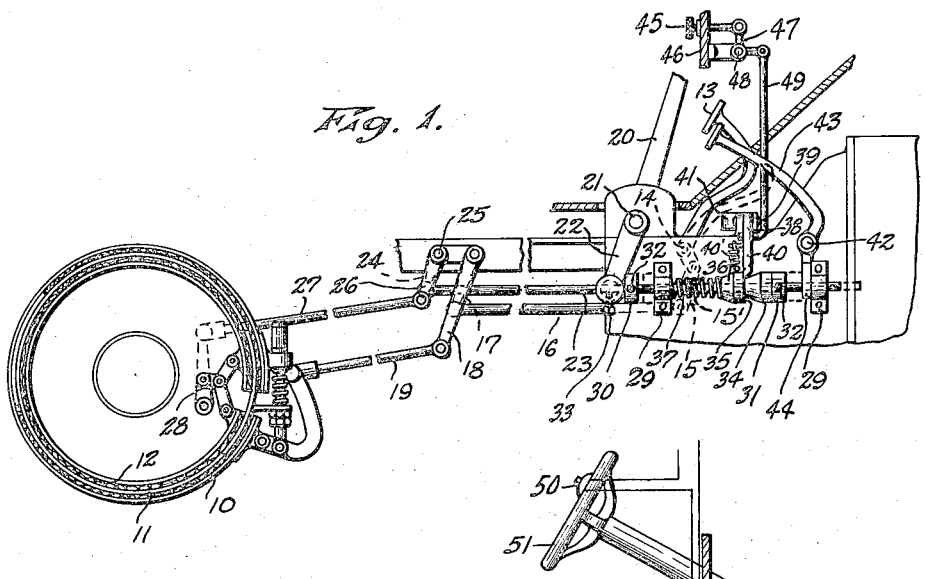

May 12, 1931. H. HUBBELL, JR 1,804,773
AUXILIARY BRAKE OPERATING MECHANISM
Filed Oct. 27, 1927

Inventor
Harvey Hubbell Jr.
By Wooster & Davis
Attorneys.

Patented May 12, 1931

1,804,773

UNITED STATES PATENT OFFICE

HARVEY HUBBELL, JR., OF BRIDGEPORT, CONNECTICUT

AUXILIARY BRAKE OPERATING MECHANISM

Application filed October 27, 1927. Serial No. 229,039.

This invention relates to brake mechanism for motor vehicles and particularly to an auxiliary operating means for the emergency brake, and it is an object of the invention to provide a brake structure and operating means in which the main or foot brake is operated in the usual manner, but in which there is automatic auxiliary power means for applying the emergency brake to assist in making a quick stop.

It is also an object to provide a mechanism which may be released either by hand or automatically by the foot pedal after it has been depressed to a certain amount so that in making quick stops the auxiliary brake may be easily and quickly applied to assist the main brakes.

It is a further object of the invention to provide a mechanism of this character which will not in any way interfere with the ordinary operation of the brakes.

With the foregoing and other objects in view, I have devised a brake mechanism one form of which is shown somewhat diagrammatically in the accompanying drawing forming a part of this specification. In the drawings, Fig. 1 is a side elevation of the brake mechanism showing both sets of brakes released.

Figure 2:
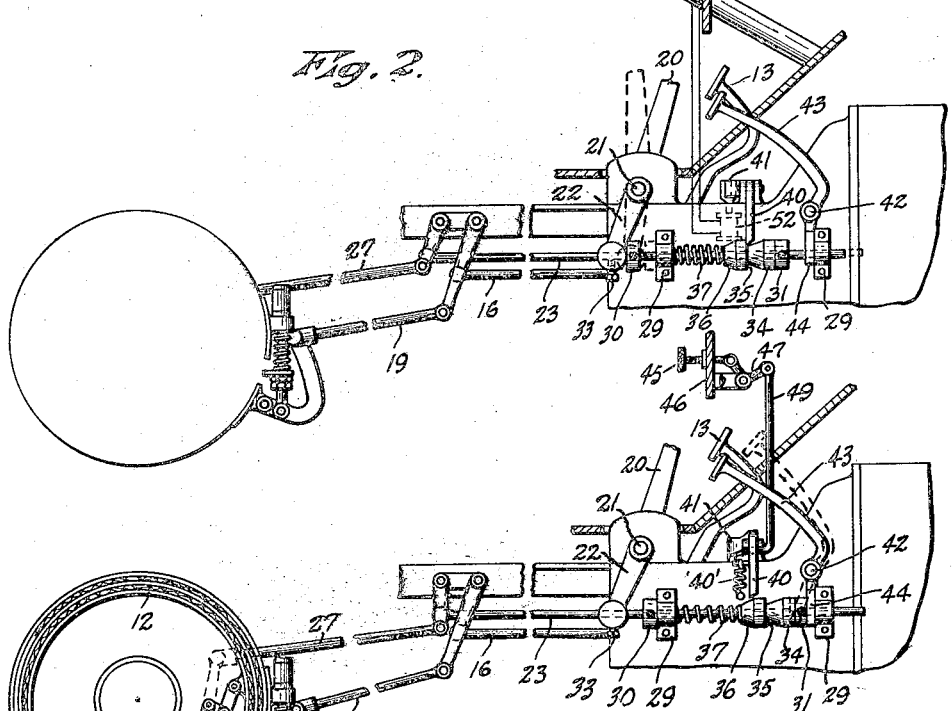
Figure 3:
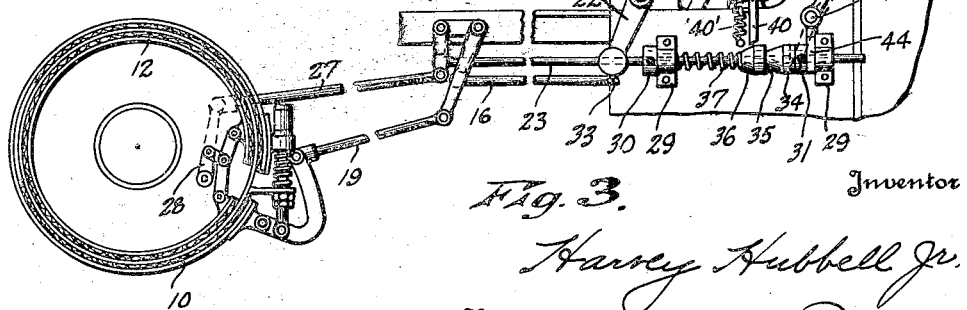

Fig. 2 is a similar view showing a slightly different release mechanism for the automatic means for applying the auxiliary brake, and Fig. 3 is a view similar to Fig. 1 showing the emergency brakes applied.

As indicated above the brake mechanism is shown somewhat diagrammatically in the drawings no attempt being made to show the mechanical details. The main or foot brake is shown as the external brake 10 operating on the outer side of the rotary drum 11 which, as is well known, rotates with the wheels, or it may be a transmission brake if desired, and 12 represents the emergency brake which is usually an internal brake operating on the inside of the drum. The external brake is operated in the well known manner by a foot pedal 13 which is shown pivoted to the frame or support at 14, and is connected through suitable link mechanism 15 and 16 to an arm 17 to operate the lever arm 18, which through the connecting rod 19 will operate the brake in the well known manner by pulling forwardly on this rod. The lever 15 is pivoted to the frame or other suitable support at 15'. The emergency or internal brake mechanism is also shown somewhat diagrammatically. This brake may be operated in the usual manner by the hand lever 20 pivoted to the frame at 21 and through the arm 22 connected to a rod 23 which is also connected to an arm 24 on a shaft 25 carrying the lever arm 26 connected by a rod 27 to the brake expanding mechanism 28. The rod 23 is shown as mounted to slide in suitable bearing brackets 29, and secured to this rod at one side of the brackets, to the left as shown in the drawings, are collars 30 and 31. These collars are rigidly secured to the rod by any suitable means, such as set screws 32, which also permit adjustment of the collars on the rod, and the head of the lever arm 22 is also preferably rigidly secured to the rod by any suitable means as a set screw 33. Mounted to slide on the rod 23 is a sleeve or collar 34 which has a groove forming a stop shoulder 35 and at its left free end is tapered as shown at 36. This sleeve is mounted next to the collar 31, and between this sleeve and the left hand bracket 29 is a spring 37 which tends to shift the sleeve 34 to the right. Cooperating with the stop sleeve 34 is a catch 38 which may be a lever pivoted to any suitable part of the frame at 39 and having a free end 40 adapted to engage the shoulder 35 to hold the sleeve 34 against movement to the right. This lever also has an arm 41 extending into the path of movement of the brake pedal 13.

Also pivoted to the frame at any suitable point 42 is a resetting foot lever 43 having an extension 44 to the right of the collar 31 to act to reset the emergency brake as will presently be described. Hand operated means are also provided, preferably located closely adjacent the driver's position so that they are easily and quickly accessible for releasing the auxiliary operating means for the emergency brake. This may be a hand operated element which is directly operated by hand to release the catch 38, as for instance a handle or knob 45, at the front of the dash 46 connected to a bell crank lever 47 pivoted at 48 at the back of the dash and connected to a rod 49 extending under the free arm 40 of the catch lever, so that by pulling forwardly on the knob 45 this lever may be raised to release the catch sleeve 34. In Fig. 2 is shown an electrical means for releasing this catch lever. In this case there is a button 50 on the steering wheel 51, or the column therefor, which controls the solenoid 52 connected to the catch lever 38 which when energized will pull downwardly on the inner arm 41 of the lever and raise the catch 40.

The operation is as follows: The arm 41 of the catch lever is preferably arranged so that it will not be engaged and operated by the foot pedal 13 for the main brake until this pedal is depressed to nearly its limit, so that during normal operation of the main brake with comparatively slow stops the emergency brake will not be affected. Should, however, a sudden stop be desirable and the main brake quickly applied to nearly its limit, the foot pedal 13 will engage the arm 41 and will raise the catch 38 from the shoulder 35, it being understood that the normal position of the elements is that of Fig. 1 with the spring 37 compressed. As the catch arm 40 is raised it will release the sleeve 34 and permit the spring 37 to shift this sleeve to the right, and by engagement of this sleeve with the collar 31 will shift the rod 23 to the right and apply the emergency brake, thus assisting in the quick stopping of the vehicle. The lever arm 40 is held in holding position by a spring 40'. The strength of the spring 37 should be such as not to set the wheels to cause skidding, but to permit them to rotate for the greatest holding effect. After the vehicle has come to a stop and the main brakes partially released the emergency brake can be released and reset for the next automatic operation by pressing forwardly on the auxiliary foot lever 43, which through the extension 44 acting on the right hand side of the collar 31 will shift the sleeve 34 and the rod 23 to the left, thus releasing the brake and allowing the catch lever 40 to engage the shoulder 35 on the sleeve 34. This action will compress the spring 37 supplying power for the next automatic operation of the emergency brake. The emergency brake may also be released and reset by swinging the emergency brake hand lever 20 forwardly in the usual manner now employed for releasing the emergency brake. This emergency brake lever can also be used in the usual manner for applying the emergency brake by merely pulling it rearwardly in the well known manner. This operation will shift the rod 23 to the right to set the emergency brake. The action will be permitted without releasing the stop sleeve 34 because this sleeve is free to slide on the rod 23. If the emergency lever is not rigidly connected to the rod 23 the arm 22 will engage the collar 30 to shift the rod 23, but this arm is preferably rigidly connected to the rod as through the set screw 33 because the lever can then be used to release the emergency brake and set the automatic means for the next operation. I also provide means controlled by hand for permitting the application of the emergency brake by the auxiliary power means, in the present case the spring 37. Thus if the operator wishes to quickly apply the emergency brake but has not time or opportunity to operate the hand lever 20 he may merely pull forward on the knob 45 adjacent the steering wheel, which will raise and release the catch lever 40 permitting the spring 37 to apply the emergency brake. In the arrangement shown in Fig. 2, the same effect would be secured by pressing on the button 50 which will energize the solenoid 52 and release the catch lever 40.

It will be apparent from the foregoing description that the main or foot operated brakes are operated in the usual manner and the emergency brakes may also be applied in the usual manner, but that in the case of an emergency or where use of the emergency brake is required quickly, it will be automatically applied when the ordinary brake pedal 13 is depressed beyond a certain position. The emergency brakes may also be applied by the auxiliary power means through the manual control 45 or 50, and they may be released and reset for the next automatic operation by the hand lever 20 shifted forwardly, in the usual manner, or they may be released and the auxiliary power means reset by pressing on the auxiliary foot lever 43.

Having thus set forth the nature of my invention, what I claim is:

1. In a brake mechanism for motor vehicles, a foot controlled brake, an emergency brake, a hand lever for applying the emergency brake, auxiliary spring means for applying the emergency brake, and means controlled by the foot brake control means to control said auxiliary spring means.

2. In a brake mechanism for motor vehicles, a main brake, pedal operated means for controlling said brake, an emergency brake, independent hand operated means for applying the emergency brake, spring means for applying the emergency brake, and means controlled by the pedal means for controlling the operation of said spring means.

3. In a brake mechanism for motor vehicles, a main brake, pedal operated means for controlling said brake, an emergency brake, independent hand operated means for applying the emergency brake, a spring tending to move the emergency brake to apply it, a catch to hold said latter brake in the released position, and means for releasing the catch to permit application of the brake.

4. In a brake mechanism for motor vehicles, a main brake, means for controlling said brake including a pedal, an emergency brake, independent hand operated means for applying the emergency brake, a spring tending to move the emergency brake to apply it, a catch to hold the emergency brake in the released position, and means operated by the pedal at a given position in its movement to release the catch.

5. In a brake mechanism for motor vehicles, a main brake, means for controlling said brake including a pedal, an emergency brake, independent hand operated means for applying the emergency brake, auxiliary power means for applying the emergency brake, and means controlled by the pedal to release said power means after the pedal has been moved to a given position in applying the main brake.

6. In a brake mechanism for motor vehicles, a main brake, means for controlling said brake including a pedal, an emergency brake, a hand lever for operating the emergency brake, auxiliary power means for setting the emergency brake, control means for normally rendering said power means ineffective, means controlled by the pedal for releasing the control means at a given time to permit application of the emergency brake, said lever being also connected to the emergency brake operating means to release said brake and reset the control means for the next operation.

7. In a brake mechanism for motor vehicles, a main brake, means for controlling said brake including a pedal, an emergency brake, independent means for operating the emergency brake, auxiliary power means for applying the emergency brake, means controlled by the pedal to release said power means, and a separate pedal connected to the emergency brake operating means to reset it for the next operation.

8. In a brake mechanism for motor vehicles, an emergency brake, personally operated means for applying said brake, power means for applying said brake, means for normally rendering the power means ineffective, and personally operated means for operating the latter means to permit the power means to function.

9. In a brake mechanism for motor vehicles, an emergency brake, means for applying said brake, separate power means for applying said brake, means for normally holding the power means ineffective, personally operated means for releasing the holding means, and means for resetting the power means in ineffective position.

In testimony whereof I affix my signature.

HARVEY HUBBELL, JR.